(12) United States Patent
Mook et al.

(10) Patent No.: US 10,969,104 B2
(45) Date of Patent: Apr. 6, 2021

(54) FUEL NOZZLE HEAT SHIELD

(71) Applicant: General Electric Company, Schenectady, NY (US)

(72) Inventors: Joshua Tyler Mook, Cincinnati, OH (US); Michael Anthony Benjamin, Cincinnati, OH (US); David Richard Barnhart, Cincinnati, OH (US); Sean James Henderson, Cincinnati, OH (US); Ramon Martinez, Cincinnati, OH (US); Neerav Atul Patel, Cincinnati, OH (US); Mark Richard Shaw, Mason, OH (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 16/059,474

(22) Filed: Aug. 9, 2018

(65) Prior Publication Data

US 2019/0056113 A1 Feb. 21, 2019

Related U.S. Application Data

(62) Division of application No. 14/443,160, filed as application No. PCT/US2013/070364 on Nov. 15, 2013, now Pat. No. 10,072,845.

(Continued)

(51) Int. Cl.
*F23R 3/28* (2006.01)
*F23R 3/14* (2006.01)
(Continued)

(52) U.S. Cl.
CPC ............. *F23R 3/283* (2013.01); *B23P 6/005* (2013.01); *B23P 15/00* (2013.01); *F02C 7/18* (2013.01);

(Continued)

(58) Field of Classification Search
CPC .. F23R 3/283; F23R 3/286; F23R 3/60; F23R 3/002; F23R 2900/03044
See application file for complete search history.

(56) References Cited

U.S. PATENT DOCUMENTS 6,546,732 B1 4/2003 Young et al.
6,898,938 B2 5/2005 Mancini et al.
(Continued)

FOREIGN PATENT DOCUMENTS

CN 1550714 A 12/2004
CN 1609427 A 4/2005
(Continued)

OTHER PUBLICATIONS

Unofficial English Translation of Chinese Office Action issued in connection with corresponding CN Application No. 201380059879.0 dated Jan. 18, 2016.
(Continued)

*Primary Examiner* — Gerald L Sung
*Assistant Examiner* — Rene D Ford
(74) *Attorney, Agent, or Firm* — Dinsmore & Shohl LLP

(57) ABSTRACT

An aft heat shield for a fuel nozzle tip includes: an annular shield wall; an annular shield flange extending radially outward from an aft end of the shield wall; an annular baffle flange surrounding the conical section, and disposed such that an axial gap is defined between the shield flange and the baffle flange, the baffle flange including a radially outer rim extending axially forward therefrom; and a plurality of impingement cooling holes passing through the baffle flange and oriented to as to direct air flow towards the shield wall.

7 Claims, 15 Drawing Sheets

Related U.S. Application Data

(60) Provisional application No. 61/726,927, filed on Nov. 15, 2012.

(51) Int. Cl.
 *B23P 6/00* (2006.01)
 *B23P 15/00* (2006.01)
 *F02C 7/18* (2006.01)

(52) U.S. Cl.
 CPC ............... *F23R 3/14* (2013.01); *F23R 3/286* (2013.01); *F23R 2900/00005* (2013.01); *F23R 2900/03042* (2013.01); *F23R 2900/03044* (2013.01); *Y02T 50/60* (2013.01)

(56) References Cited

U.S. PATENT DOCUMENTS

| | | |
|---|---|---|
| 7,051,532 B2 | 5/2006 | Howell et al. |
| 7,716,931 B2 | 5/2010 | Mancini et al. |
| 8,136,359 B2 | 3/2012 | Stuttaford et al. |
| 8,171,735 B2 | 5/2012 | Mancini et al. |
| 8,607,569 B2 | 12/2013 | Helmick et al. |
| 2009/0255102 A1 | 10/2009 | McMasters et al. |
| 2009/0256003 A1 | 10/2009 | McMasters et al. |
| 2010/0263382 A1 | 10/2010 | Mancini et al. |
| 2011/0259976 A1 | 10/2011 | Tyler et al. |
| 2012/0031098 A1 | 2/2012 | Ginessin et al. |
| 2012/0151928 A1 | 6/2012 | Patel et al. |

FOREIGN PATENT DOCUMENTS

| | | |
|---|---|---|
| CN | 101029739 A | 9/2007 |
| CN | 101943060 A | 1/2011 |
| EP | 0587580 A1 | 3/1994 |
| EP | 1790908 A1 | 5/2007 |
| EP | 2466207 A2 | 6/2012 |
| WO | 2009126485 A2 | 10/2009 |

OTHER PUBLICATIONS

International Search Report and Written Opinion dated Feb. 24, 2014 which was issued in connection with PCT Patent Application No. PCT/US13/070364 which was filed on Nov. 15, 2013.

FUEL NOZZLE HEAT SHIELD

CROSS-REFERENCE TO RELATED APPLICATION

This application is a divisional of U.S. application Ser. No. 14/443,160, filed on May 15, 2015, titled "FUEL NOZZLE HEAT SHIELD", which is related to PCT/US2013/070364, filed Nov. 15, 2013, titled "FUEL NOZZLE AFT HEAT SHIELD", which is related to U.S. Provisional Application No. 61/726,927, titled "FUEL NOZZLE TWO PIECE AFT HEAT SHIELD", which are hereby expressly incorporated herein by reference in their entirety."

BACKGROUND OF THE INVENTION

Embodiments of the present invention relate to gas turbine engine fuel nozzles and, more particularly, to aft heat shields at the aft ends of fuel nozzle tips.

Aircraft gas turbine engine staged combustion systems have been developed to limit the production of undesirable combustion product components such as oxides of nitrogen (NOx), unburned hydrocarbons (HC), and carbon monoxide (CO), particularly, in the vicinity of airports where they contribute to urban photochemical smog problems. Gas turbine engines also are designed to be fuel efficient and have a low cost of operation. Other factors that influence combustor design are the desires of users of gas turbine engines for efficient, low cost operation, which translates into a need for reduced fuel consumption while at the same time maintaining or even increasing engine output. As a consequence, important design criteria for aircraft gas turbine engine combustion systems include provisions for high combustion temperatures, in order to provide high thermal efficiency under a variety of engine operating conditions, as well as minimizing undesirable combustion conditions that contribute to the emission of particulates, and to the emission of undesirable gases, and to the emission of combustion products that are precursors to the formation of photochemical smog.

Effective intermixing of the injected fuel and the combustion air helps to minimize the production of the undesirable combustion product components. In that regard, numerous swirlers, mixer designs, and venturi designs have been proposed over the years to improve the mixing of the fuel and air. In this way, burning occurs uniformly over the entire mixture and reduces the level of HC and CO that result from incomplete combustion. Venturis promote better mixing of fuel and air in fuel nozzles which is useful in reducing undesirable combustion emissions. Venturis have been designed with aft heat shields at the aft end of the fuel nozzle to protect the venturi and the rest of the fuel nozzle tip from heat for reducing undesirable effects from thermal exposure. Heat shields have also been designed for use at the end of other conical wall sections in the fuel nozzle tip such as an annular pilot housing which supports a pilot nozzle in the fuel nozzle tip. An example of such a heat shield at the aft end of a conical section of an annular pilot housing is disclosed in U.S. Pat. No. 8,171,735 to Mancini, et al. which issued on May 8, 2012, entitled "Mixer Assembly For Gas Turbine Engine Combustor", assigned to the assignee of this patent, and incorporated herein by reference.

Accordingly, it would be desirable to have a more effective heat shield to protect a venturi used for mixing fuel and air in fuel nozzles to protect the fuel nozzle tip from heat for reducing undesirable effects from thermal exposure. It is desirable to have venturis with integral heat shields having features that promote heat exchange and cooling of structures. It is highly desirable to provide better cooling of the aft heat shield in order to reduce effects of the high thermal loading on heat shield life. It is also desirable to provide a better design for replacing and welding in a new heat shield.

BRIEF SUMMARY OF THE INVENTION

This need is addressed by the present invention, which provides an air-cooled heat shield which is disposed at the aft end of a fuel nozzle of the type including an annular pilot housing surrounded by an annular casing. In one configuration, the heat shield may include an annular shield flange with a counterbore that attaches to the aft end of the pilot housing through a slip fit, surrounded by an annular baffle flange that may be attached to the aft end of the casing by a metallurgical bond such as brazing or welding.

According to one aspect of the invention, an aft heat shield for a fuel nozzle tip includes: an annular shield wall having a forward cylindrical section with a counterbore formed therein, and an aft conical section; an annular shield flange extending radially outward from an aft end of the conical section; an annular baffle flange surrounding the conical section, and disposed such that an axial gap is defined between the shield flange and the baffle flange, the baffle flange including a radially outer rim extending axially forward therefrom; and a plurality of impingement cooling holes passing through the baffle flange and oriented to as to direct air flow towards the adjacent shield wall.

According to another aspect of the invention, the surface of the counterbore defines a convex-curved land.

According to another aspect of the invention, the shield flange includes opposed, spaced-apart forward and aft faces bounded by an annular outer face, and wherein a convex radius is formed at an intersection of the forward face and the outer face.

According to another aspect of the invention, a row of cooling holes are disposed at a juncture between the radially outer rim and the baffle flange, the cooling holes oriented to direct cooling air towards a radially outer edge of the shield flange.

According to another aspect of the invention, at least one row of cooling holes in the baffle flange are oriented to direct cooling air perpendicular to a forward face of the shield flange.

According to another aspect of the invention, an inner shield is disposed within an outer baffle; the inner shield defines the shield wall and the shield flange; and the outer baffle includes: a conical baffle wall which surrounds the aft conical section of the inner shield; and the baffle flange extending from an aft end of the baffle wall.

According to another aspect of the invention, the inner shield and the outer baffle are two separate components which are metallurgically bonded to each other.

According to another aspect of the invention, the inner shield includes a raised island which contacts the outer baffle, the raised island having a radial array of slots formed therein.

According to another aspect of the invention, the outer baffle includes a thickened forward end which contacts the inner shield, the raised island and the thickened forward end cooperatively defining a cooling air plenum between the inner shield and the outer baffle, the cooling air plenum communicating with the axial gap between the shield flange and the baffle flange through the slots in the raised island.

According to another aspect of the invention, the conical baffle wall of the outer baffle includes a plurality of cooling air ports communicating with the cooling air plenum.

According to another aspect of the invention, a plurality of stops extend radially outwardly from the cooled side of the inner shield and engage the thickened forward end of the outer baffle so as to axially position the outer baffle relative to the inner shield.

According to another aspect of the invention, the inner shield and the outer baffle cooperatively define a cooling air plenum between them, the cooling air plenum being in fluid communication with the axial gap between the shield flange and the baffle flange.

According to another aspect of the invention, the conical baffle wall of the outer baffle includes a plurality of cooling air ports communicating with the cooling air plenum.

According to another aspect of the invention, an island disposed within the cooling air plenum interconnects the inner shield and the outer baffle.

According to another aspect of the invention, an annular array of cooling slots extend through the island.

According to another aspect of the invention, a concave inner radius is defined at the juncture of the baffle flange, the aft conical section, and the shield flange.

According to another aspect of the invention, at least one row of cooling holes in the baffle flange are oriented to direct cooling air towards the concave inner radius.

According to another aspect of the invention a fuel nozzle apparatus for a gas turbine engine includes: an annular pilot housing, the pilot housing including a conical wall section; an annular main fuel injector surrounding the pilot housing; an annular fuel nozzle casing; and a heat shield including: an annular shield wall; an annular shield flange extending radially outward from an aft end of the shield wall; an annular baffle flange surrounding the shield wall, and disposed such that an axial gap is defined between the shield flange and the baffle flange, the baffle flange including a radially outer rim extending axially forward therefrom; and a plurality of impingement cooling holes passing through the baffle flange and oriented so as to direct air flow towards the shield wall.

According to another aspect of the invention, the annular shield wall includes a forward cylindrical section, and an aft conical section the conical wall section of the pilot housing is attached to a counterbore formed in the cylindrical section of the heat shield through a slip fit; and an aft end of the annular fuel nozzle casing is bonded to the radially outer rim of the baffle flange through a metallurgical bond.

According to another aspect of the invention, the apparatus further includes a pilot fuel injector.

According to another aspect of the invention, a method of repairing the fuel nozzle apparatus after field use includes: separating the heat shield from the pilot housing and the fuel nozzle casing; assembling the conical wall section of the pilot housing to a counterbore formed in the cylindrical section of a replacement heat shield through a slip fit; and metallurgically bonding an aft end of the annular fuel nozzle casing to a radially outer rim of a baffle flange of the replacement heat shield.

According to another aspect of the invention, a method of repairing the fuel nozzle apparatus after field use includes: separating the heat shield from the pilot housing and the fuel nozzle casing; and metallurgically bonding a replacement heat shield to the pilot housing and the fuel nozzle casing.

According to another aspect of the invention, a method of repairing the fuel nozzle apparatus after field use includes: separating the heat shield from the pilot housing and the fuel nozzle casing; machining an aft end of the conical wall section of the pilot housing to include a cylindrical outer surface; assembling the machined cylindrical outer surface to a counterbore formed in the cylindrical section of a replacement heat shield through a slip fit; and metallurgically bonding an aft end of the annular fuel nozzle casing to a radially outer rim of a baffle flange of the replacement heat shield.

According to another aspect of the invention, a method of assembling a fuel nozzle for a gas turbine engine, includes: providing a fuel nozzle body having: a central pilot fuel injector; an annular pilot housing surrounding the central pilot fuel injector, the pilot housing including a conical wall section; an annular main fuel injector surrounding the pilot housing; an annular fuel nozzle casing; and assembling a heat shield to the fuel nozzle body by: engaging the conical wall section of the pilot housing to a counterbore of a cylindrical portion of the heat shield using a slip fit; and metallurgically bonding an aft end of the annular fuel nozzle casing to a radially outer rim of the baffle flange of the heat shield.

According to another aspect of the invention, the metallurgical bond is formed by fusion welding.

According to another aspect of the invention, at least a portion of the apparatus is a unitary structure manufactured utilizing a rapid manufacturing process.

BRIEF DESCRIPTION OF THE DRAWINGS

The invention may be best understood by reference to the following description taken in conjunction with the accompanying drawing figures in which.

DETAILED DESCRIPTION OF THE INVENTION

Generally, embodiments of the present invention provide an air-cooled heat shield. It may be a separate component that is attached to the aft end of a fuel nozzle of the type including an annular pilot housing surrounded by an annular casing, or it may be integrally formed with the aft end of a fuel nozzle. The heat shield may include an annular shield flange with a counterbore that attaches to the aft end of the pilot housing through a slip fit, surrounded by an annular baffle flange that may be attached to the aft end of the casing by a metallurgical bond such as brazing or welding.

Figure 1:
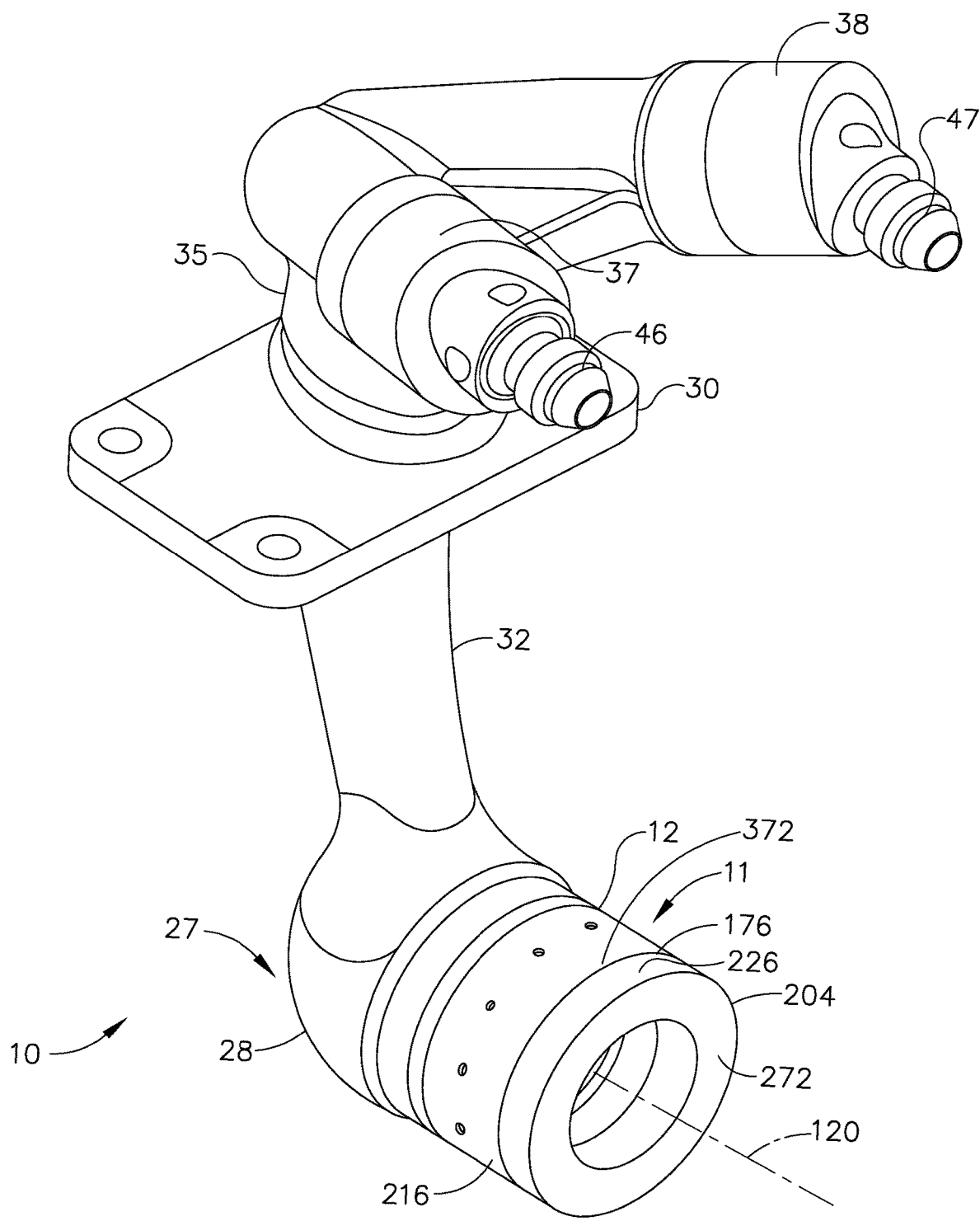
FIG. 1 is an aft looking forward perspective view illustration of a gas turbine engine fuel injector having a nozzle tip with an aft heat shield in accordance with an embodiment.

Now, referring to the drawings wherein identical reference numerals denote the same elements throughout the various views, FIG. 1 depicts an exemplary embodiment of a fuel injector 10 including a nozzle mount or flange 30 adapted to be fixed and sealed to a combustor casing (not shown). A hollow stem 32 extends radially inwardly from the flange 30 and includes an annular hollow inlet fairing 28 surrounding an annular pilot inlet 27 of the fuel injector 10. The hollow stem 32 in the exemplary fuel injector illustrated herein is integral and integrally formed with the inlet fairing 28. The hollow stem 32 of the fuel injector 10 may be integral with (as illustrated herein) or fixed to the flange 30 (such as by brazing or welding).

Figure 2:
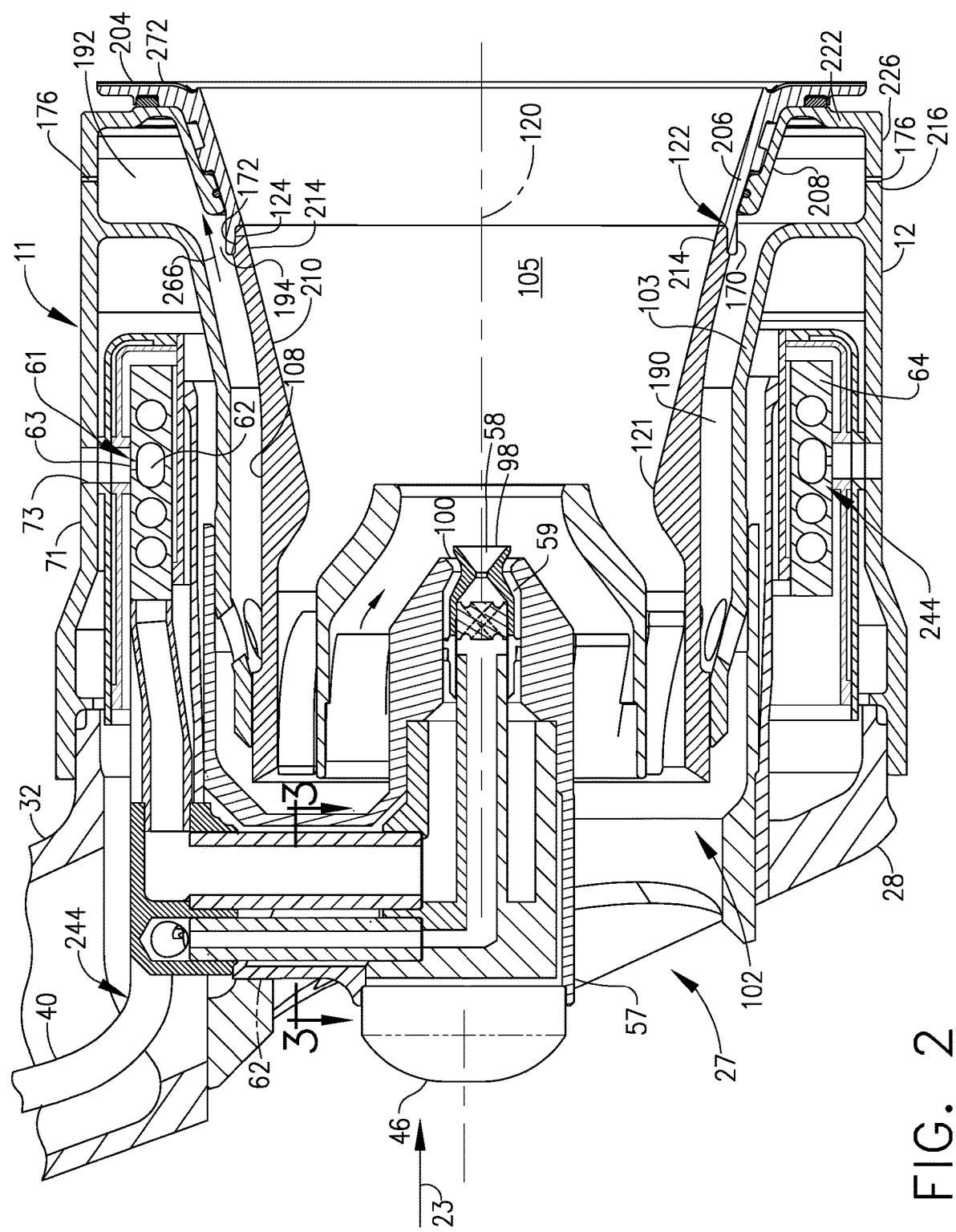
FIG. 2 is a cross sectional view illustration of the nozzle tip and the aft heat shield illustrated in FIG. 1.

An injector valve housing 35 includes pilot and main valve housings 37, 38 at the top of the hollow stem 32 Pilot and main valves (not shown) are illustrated and discussed in detail in United States Patent Application Publication No. 20100263382 to Mancini, et al., entitled "DUAL ORIFICE PILOT FUEL INJECTOR", assigned to the assignee of this patent application, and incorporated herein by reference. Pilot and main valve inlets 46, 47 of the pilot and main valve housings 37, 38 respectively are used to fluidly connect the valves contained within the housing to fuel supply manifolds (not shown). Referring to FIGS. 1 and 2, the hollow stem 32 and the inlet fairing 28 radially support a nozzle tip 11 including a fuel nozzle body 12 and a two piece aft heat shield 204 attached or bonded to an aft end 216 of the fuel nozzle body 12. The nozzle tip 11 is illustrated as having a dual orifice pilot fuel injector tip and includes a centerline axis 120.

Referring to FIG. 2, the fuel nozzle body 12 includes a main fuel nozzle 61 and a dual orifice pilot fuel injector tip 57 having substantially concentric primary and secondary pilot fuel nozzles 58, 59 substantially centered in the annular pilot inlet 27. The exemplary fuel nozzle body 12 illustrated in FIGS. 1 and 2 is an assembly of various parts or elements. Alternatively, all or a portion of the fuel nozzle body 12 may be a unitary, one piece, monolithic structure or element of the fuel injector 10 and may be manufactured utilizing a rapid manufacturing process such as Direct Metal Laser Sintering (DMLS) or Direct Metal Laser Melting (DMLM). The fuel nozzle body 12 is mounted by its casing 71 to the inlet fairing 28 which is connected to or integral with the hollow stem 32 as illustrated in FIG. 1.

Referring to FIGS. 1 and 2, the fuel nozzle body 12 may be metallurgically bonded to the inlet fairing 28 by brazing and/or welding. The nozzle tip 11 further includes the annular two piece aft heat shield 204 attached to the fuel nozzle body 12. An annular pilot housing 108 supports the primary and secondary pilot fuel nozzles 58, 59. The fuel injector 10 includes a multi-conduit fuel circuit 244 operable to supply fuel from a fuel conduit 40 to the main fuel nozzle 61 and to the primary and secondary pilot fuel nozzles 58, 59.

The main fuel nozzle 61 includes an annular main fuel passage 62 disposed in an annular main fuel ring 64. The main fuel nozzle 61 includes a circular or annular array of fuel injection orifices 63 extending radially outwardly from the annular main fuel passage 62 and through the wall of the annular main fuel ring 64. The annular main fuel passage 62 is part of the fuel circuit 244. The main fuel nozzle 61 and the annular main fuel ring 64 are spaced radially outwardly of the primary and secondary pilot fuel nozzles 58, 59. The secondary pilot fuel nozzle 59 is radially located directly adjacent to and surrounds the primary pilot fuel nozzle 58.

A fuel nozzle outer casing 71 surrounds the main fuel nozzle 61 and includes cylindrical fuel spray wells 73 aligned with the fuel injection orifices 63. The primary and secondary pilot fuel nozzles 58, 59 and main fuel nozzle 61 are aligned about the centerline axis 120. A centerbody 103 which includes the fuel nozzle outer casing 71 is radially disposed around and supports the primary and secondary pilot fuel nozzles 58, 59 and the main fuel nozzle 61. The annular pilot housing 108 is supported by and attached to the centerbody 103.

The annular pilot housing 108 surrounds, is attached to, and supports a pilot mixer 102. The annular pilot housing 108 includes a conical wall section 210 circumscribing a conical pilot mixing chamber 105 that is in flow communication with, and downstream from, the pilot mixer 102 and circular primary and annular secondary exits 98, 100 of the primary and secondary pilot fuel nozzles 58, 59 respectively. The air swirler vanes of the pilot mixer 102 radially support the dual orifice pilot fuel injector tip 57 The dual orifice pilot fuel injector tip 57 is disposed within the pilot mixer 102. A venturi includes a throat 121 followed by a diverging section defined by the annular pilot housing 108. The diverging section is provided by the conical wall section 210 which extends downstream or axially aftwardly from the throat 121 and continues with the two piece aft heat shield 204.

Figure 3:
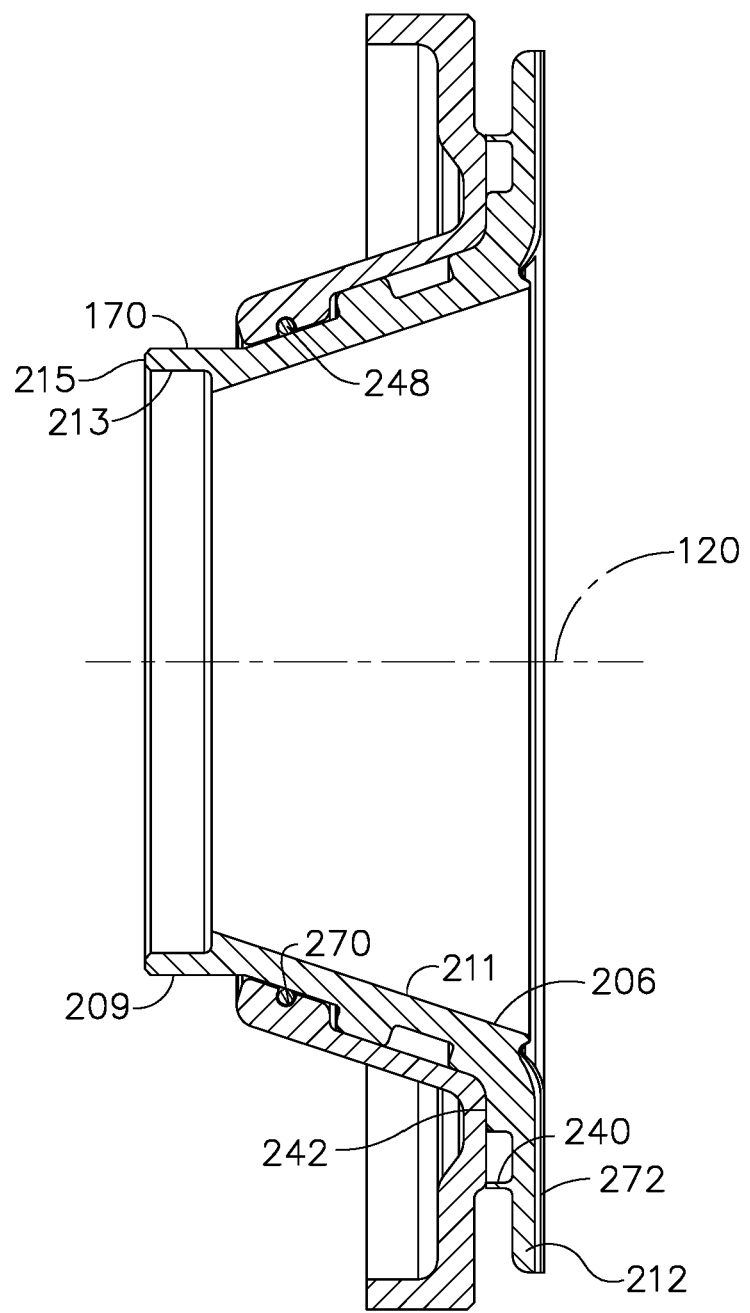
FIG. 3 is an enlarged cross sectional view illustration of the aft heat shield illustrated in FIG. 2.
Figure 9:
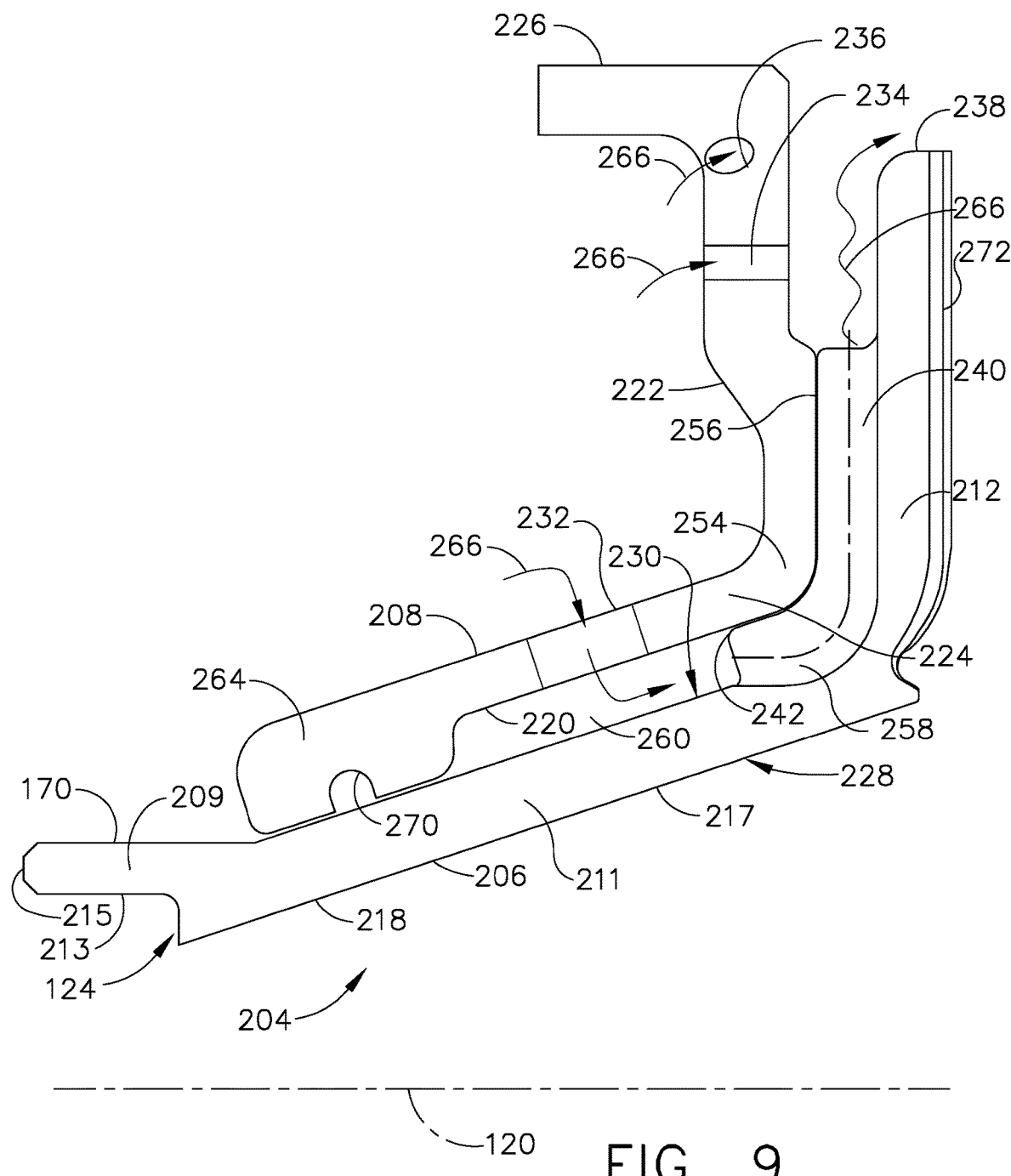
FIG. 9 is an enlarged sectional view of a portion of the aft heat shield illustrated in FIG. 3.

Referring to FIGS. 2, 3, and 9, the two piece aft heat shield 204 may be attached to a conical aft end 214 of the conical wall section 210 of the annular pilot housing 108 by a slip fit indicated by a slip fit joint 122. The two piece aft heat shield 204 may be attached to the aft end 216 of the fuel nozzle outer casing 71 by welding or other metallurgical bond indicated by a weld seam 176. The two piece aft heat shield 204 includes an inner shield 206 brazed or otherwise metallurgically bonded to an outer baffle 208. A cylindrical forward end 170 of the inner shield 206 is mounted on a cylindrical radially outer surface 172 on the conical aft end 214 of the conical wall section 210 using a slip fit between the radially outer surface 172 and the cylindrical forward end 170. The conical aft end 214 of the conical wall section 210 is fitted into a cylindrical counterbore 124 in the cylindrical forward end 170.

Figure 4:
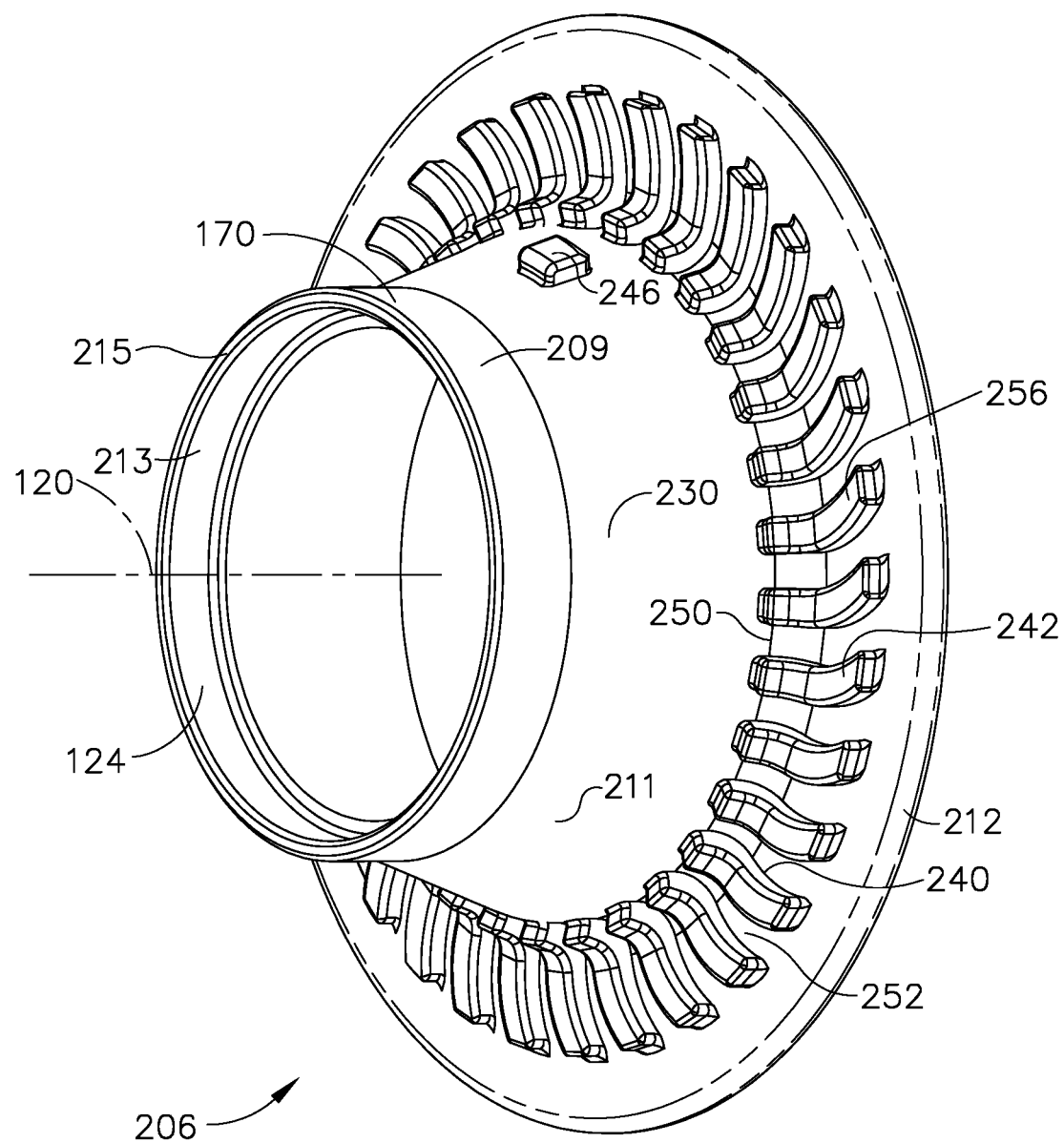
FIG. 4 is a forward looking aft perspective view illustration of an inner shield of the aft heat shield illustrated in FIG. 2.

Referring to FIGS. 3, 4, and 9, the inner shield 206 includes an annular shield wall section 217 including a forward cylindrical section 209 followed by an aft conical section 211 and an annular shield flange 212 at an aft end of the aft conical section 211. A counterbore 213 extends part way through a front end 215 of the cylindrical section 209. The aft conical section 211 may also be referred to as a heatshield bore 218. The inner shield 206 includes opposite hot and cooled sides 228, 230. A plurality of cooling slots 240 extend through a raised island 242 extending away from the cooled side 230 of the inner shield 206 and along an aft portion 250 of the aft conical section 211 and along a radially inward portion 252 of the shield flange 212 as illustrated in FIG. 4. The cooling slots 240 may be clocked, angled, or curved circumferentially as illustrated.

Figure 5:
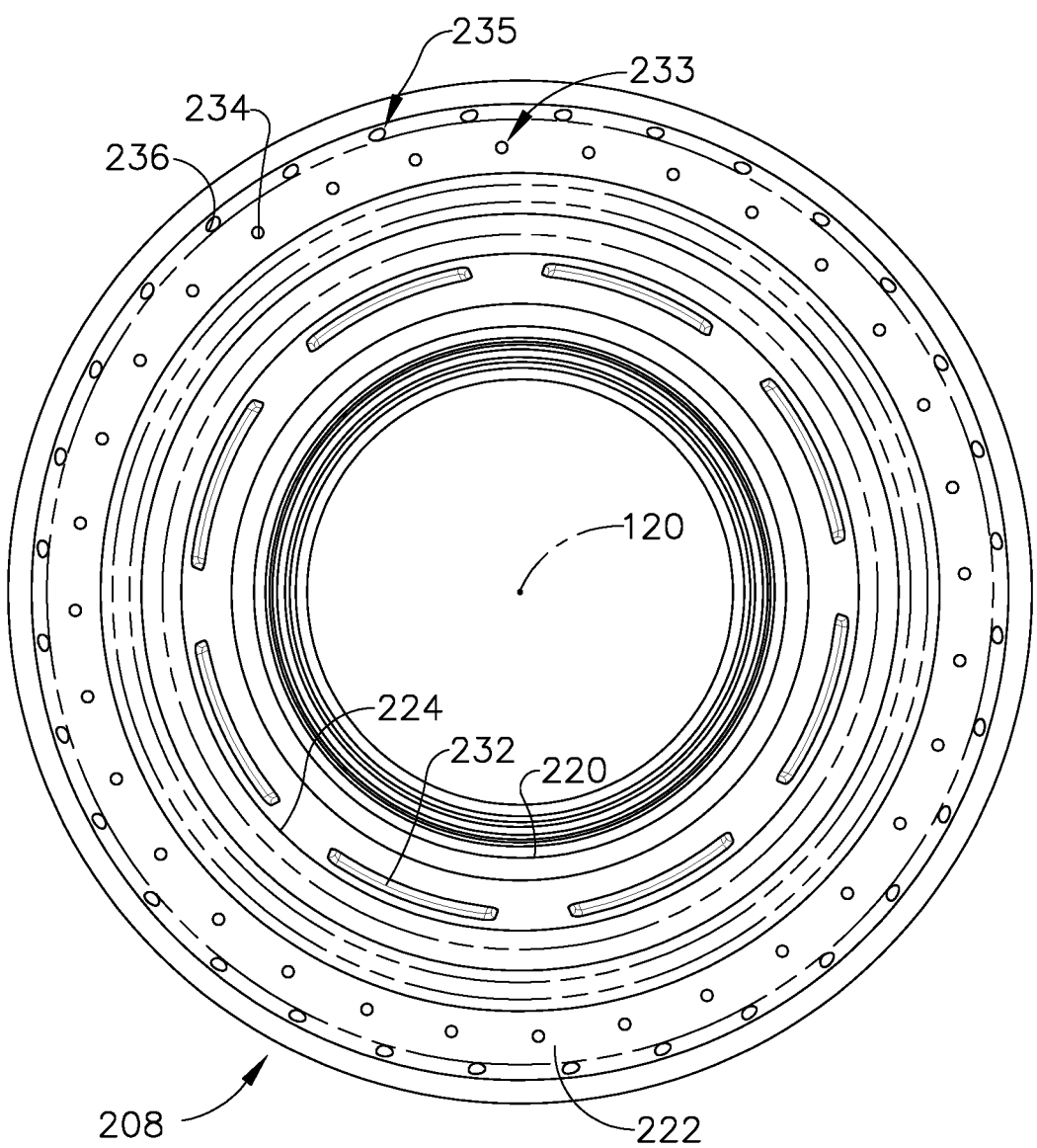
FIG. 5 is forward looking aft perspective view illustration of an outer baffle on a forward end of the aft heat shield illustrated in FIG. 2.
Figure 7:
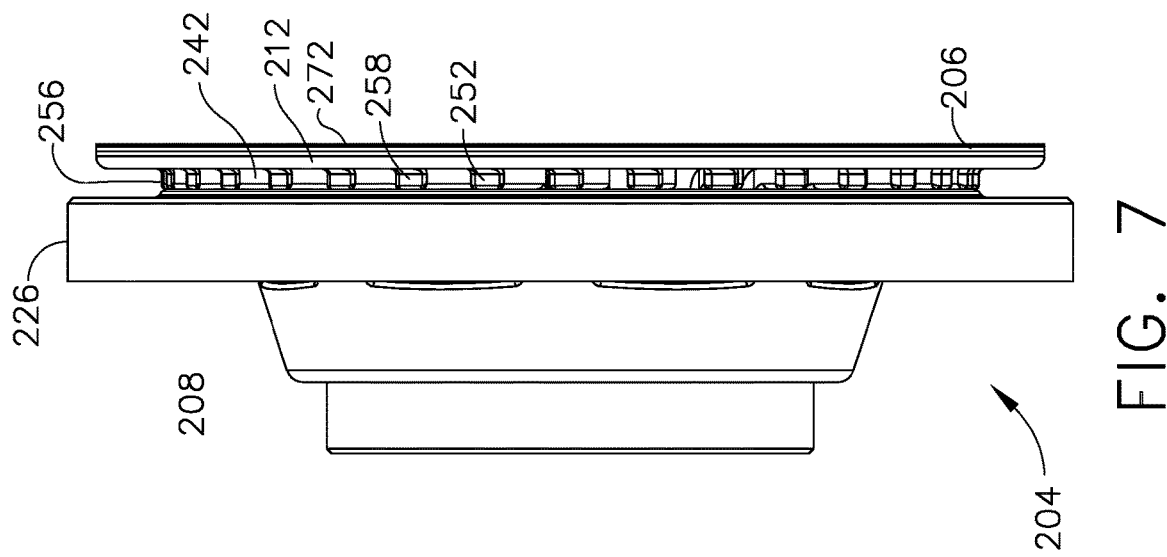
FIG. 7 is a side view illustration of the aft heat shield illustrated in FIG. 6.
Figure 8:
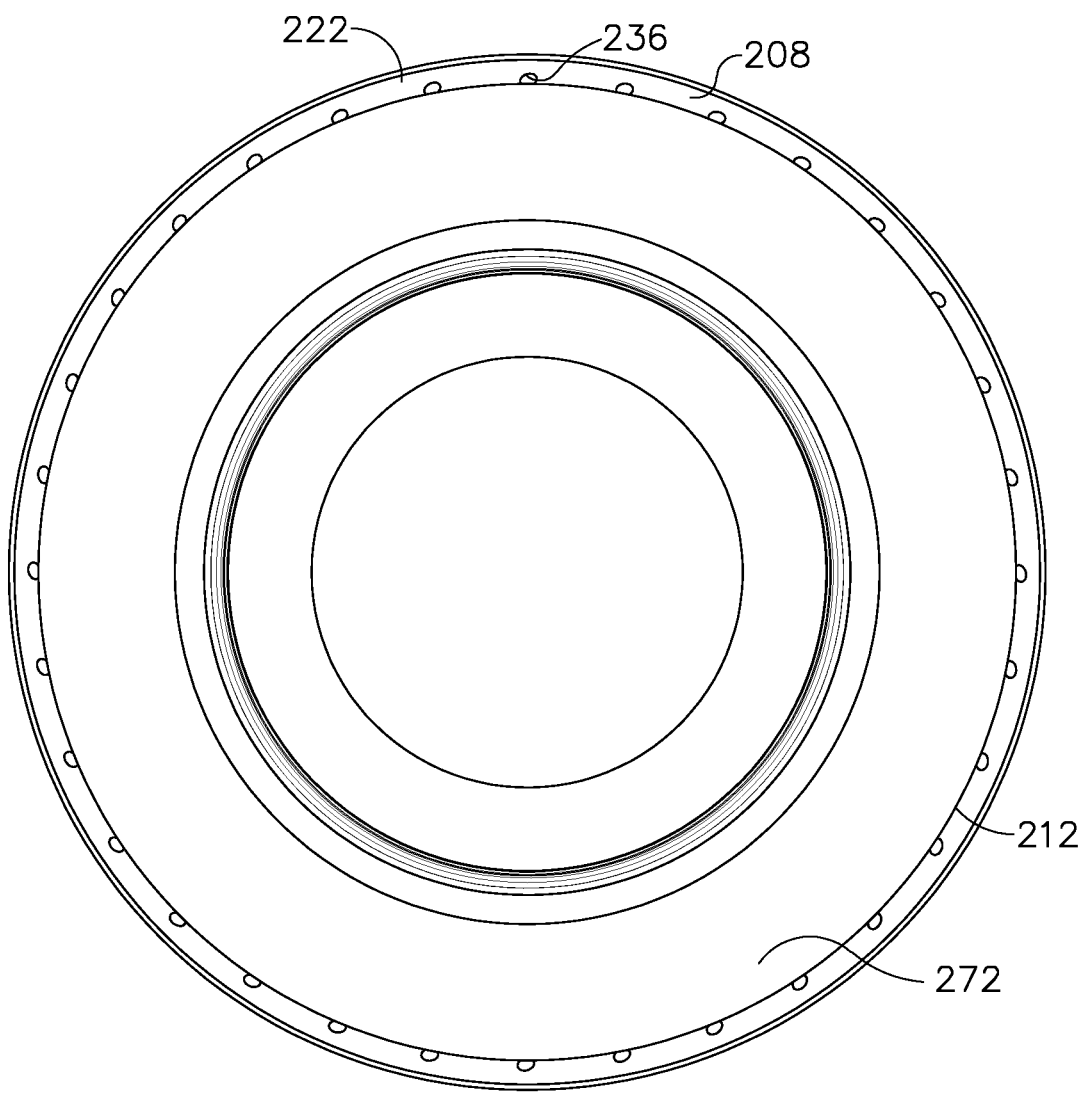
FIG. 8 is an aft looking forward elevational view illustration of the aft heat shield illustrated in FIG. 3.

Referring to FIGS. 5, 8, and 9, the outer baffle 208 includes a conical baffle wall 220 having an annular baffle flange 222 at an aft end 224 of the conical baffle wall 220. The outer baffle 208 includes elongated cooling air ports 232 extending through the conical wall section 220 and radially inner and outer rows 233, 235 of inner and outer impingement holes 234, 236 respectively extending through the annular baffle flange 222. The inner impingement holes 234 are oriented in the axial direction parallel to the centerline axis 120. The outer impingement holes 236 are clocked or circumferentially angled with respect to the centerline axis 120 and are aimed to impinge cooling air 266 on or near a radially outer annular flange tip 238 of the annular shield flange 212. An annular radially outer rim 226 of the annular baffle flange 222 may be welded or otherwise metallurgically bonded to the casing aft end 216 of the fuel nozzle outer casing 71 illustrated at the weld seam 176 illustrated in FIGS. 1 and 2.

Referring to FIGS. 4, 6, 7 and 9, the outer baffle 208 includes a baffle corner 254 between the conical baffle wall 220 and the baffle flange 222. The baffle corner 254 conforms to and sealing against and along an outer shield surface 256 of the raised island 242 along at least a portion of the aft portion 250 of the aft conical section 211 and at least a portion of the radially inward portion 252 of the shield flange 212. Convective cooling holes 258 include the cooling slots 240 bounded by the corner 254 conforming to and sealing against and along the outer shield surface 256 of the raised island 242.

An annular cooling air plenum 260 extends generally axially along the aft conical section 211 of the inner shield 206 between a thickened forward end 264 of the outer baffle 208 and the raised island 242. The annular cooling air plenum 260 is operable to flow cooling air 266 through the convective cooling holes 258. The arcuate cooling air ports 232 in the outer baffle 208 are operable to supply the cooling air 266 to the annular cooling air plenum 260. The cooling air 266 flows through the convective cooling holes 258 and then radially outwardly along the annular shield flange 212 and over the radially outer annular flange tip 238 of the annular shield flange 212. This provides convective cooling along most of the cooled side 230, a large portion of the aft conical section 211 or heatshield bore 218, and a portion of the annular shield flange 212 of the inner shield 206.

Stops 246, illustrated more particularly in FIG. 4, extending radially outwardly from the cooled side 230 of the inner shield 206 and engages the thickened forward end 264 of the outer baffle 208 to properly axially position the outer baffle 208 with respect to the inner shield 206 and the raised island 242. The axial positioning is for the purpose of brazing the outer baffle 208 to the inner shield 206 and positioning and sealing the cooling air plenum 260.

Figure 6:
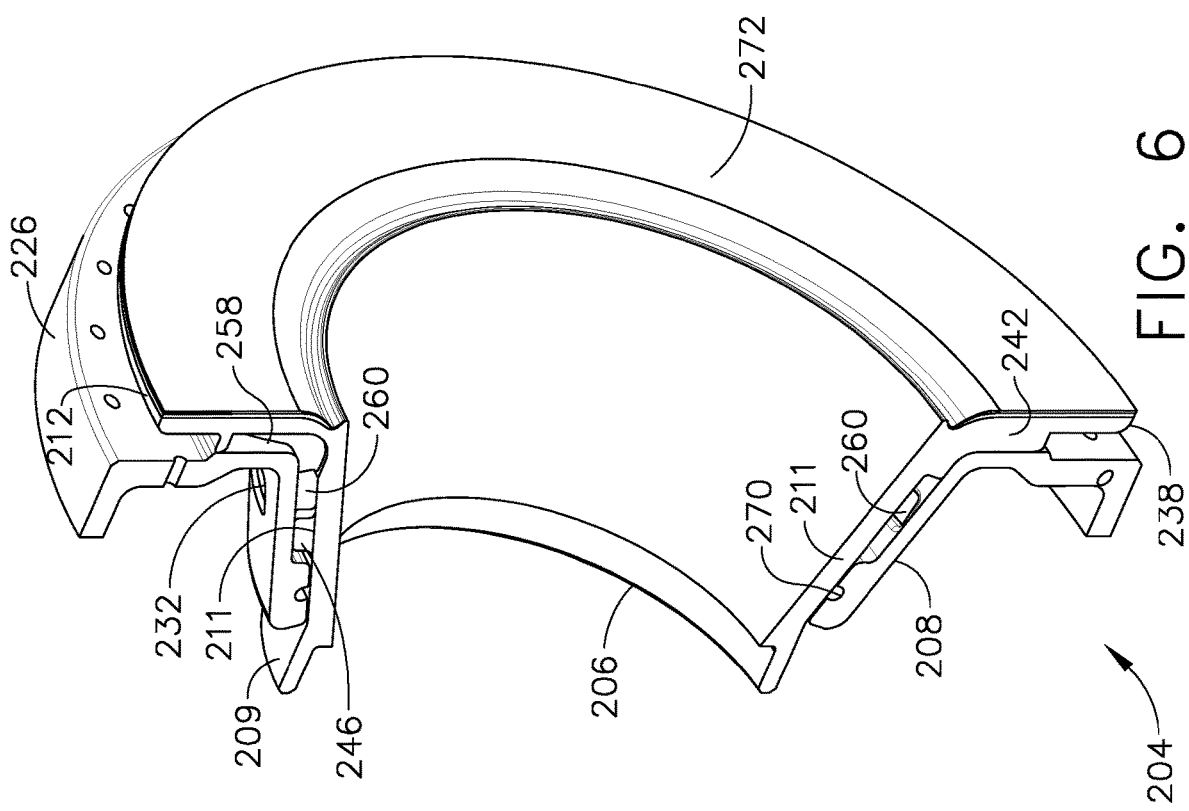
FIG. 6 is a cut away perspective view illustration of the aft heat shield illustrated in FIG. 3.

A radially inwardly facing annular groove 270 may be disposed in the thickened forward end 264 of the outer baffle 208. The groove 270 is used for holding a brazing wire 248 (illustrated in FIG. 3) which is then melted to braze and metallurgically bond the baffle 208 to the inner shield 206. Referring to FIGS. 6, 8, and 9, an annular thermal barrier coating 272 may be bonded on the aft face of the shield flange 212 to provide additional thermal protection for the fuel nozzle body 12 of the nozzle tip 11.

Referring to FIG. 2, an axially or downstream extending injector cooling flowpath 190 is disposed between the annular pilot housing 108 and the centerbody 103. An aft annular plenum 192 at an aft end 194 of the injector cooling flowpath 190 is used to supply the cooling air 266 to the aft heat shield 204.

The cooling air 266 is a portion of pilot airflow 23 flowing into the pilot mixer 102. The cooling air 266 has a relatively high velocity air diffusing through plenum 260 and cooling slots 240 to effectively cool the heat shield plate bore which is represented herein by the heatshield bore 218 and the heat shield plate 212. Cooling effectiveness is achieved by increased surface area and high velocity air. The radially inner and outer rows 233, 235 of inner and outer impingement holes 234, 236 respectively extending through the annular baffle flange 222 helps diffuse the exit air velocity into the flowpath and cool the heat shield outer edge at the radially outer annular flange tip 238 of the annular shield flange 212.

Figure 14:
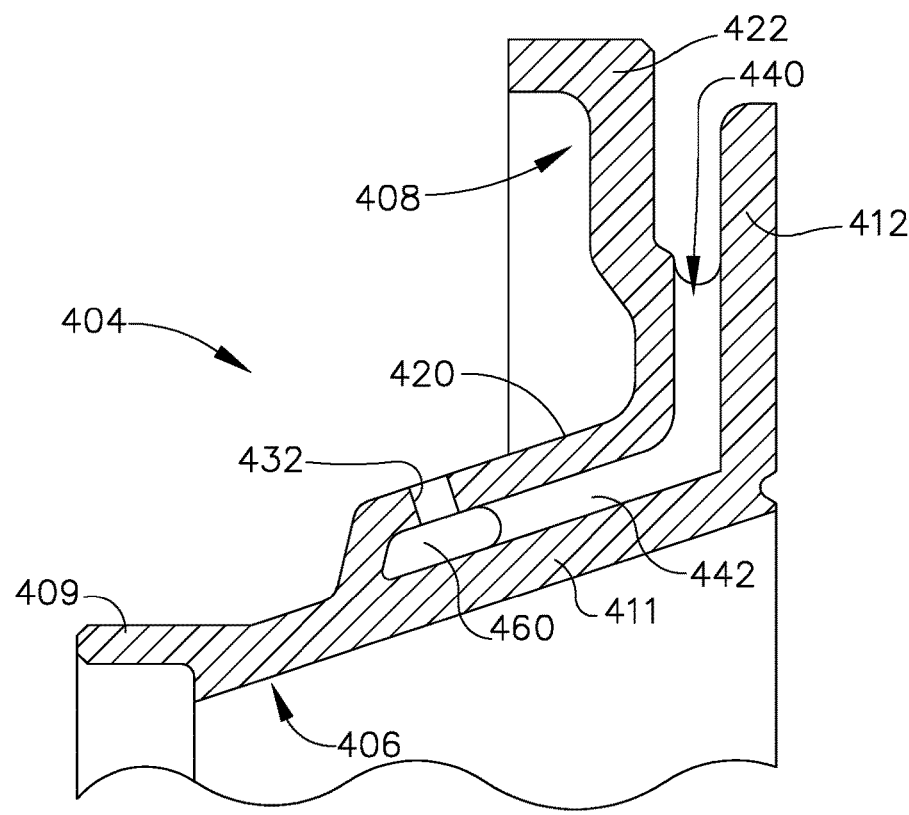
FIG. 14 is a cross-sectional view of a portion of an alternative version of the aft heat shield illustrated in FIG. 3.
Figure 15:
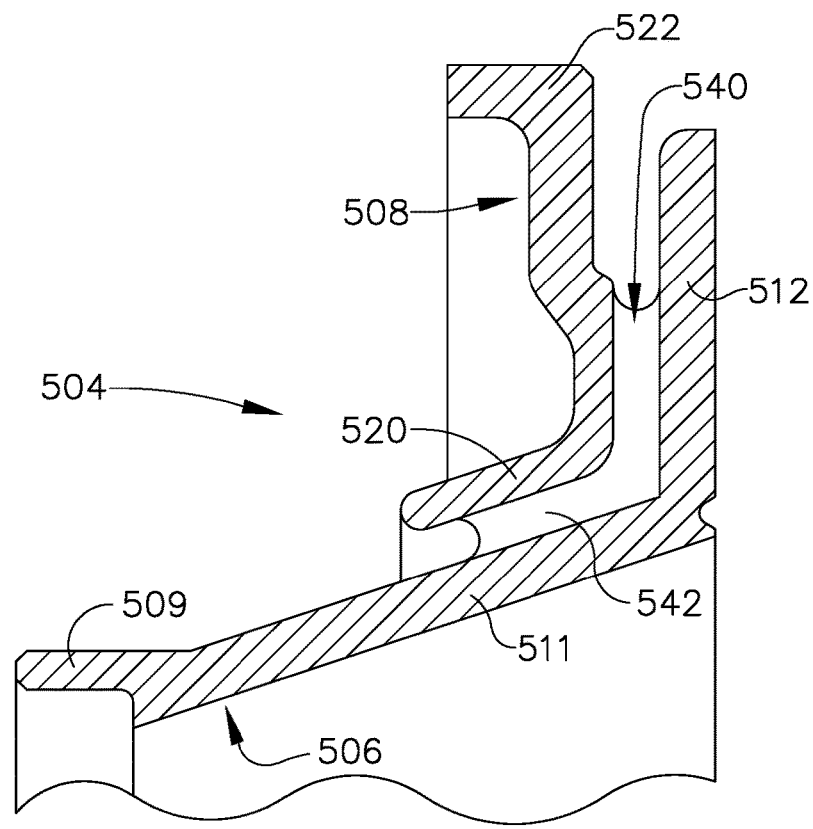
FIG. 15 is a cross-sectional view of a portion of an alternative version of the aft heat shield illustrated in FIG. 3.

The exemplary aft heat shield 204 has been described above as an assembly of various parts or elements. However, all or a portion of the aft heat shield may be a unitary, one piece, monolithic structure or element and may be manufactured utilizing a rapid manufacturing process such as Direct Metal Laser Sintering (DMLS) or Direct Metal Laser Melting (DMLM). For example, FIGS. 14 and 15 illustrate heat shields 404 and 504, respectively which are unitary, one piece, or monolithic and which may be constructed using a rapid manufacturing process. Each of these heat shields 404 and 504 is generally similar in construction to the aft heat shield 204 described above.

As seen in FIG. 14, the single-piece aft heat shield 404 comprises an annular inner shield 406 including a forward cylindrical section 409 followed by an aft conical section 411, with an annular shield flange 412 at the aft end of the conical section 411. An outer baffle 408 includes a conical baffle wall 420 having an annular baffle flange 422 at an aft end of the conical baffle wall 420. An annular cooling air plenum 460 is defined between the outer baffle 408 and the inner shield 406. Cooling air ports 432 formed in the conical baffle wall 420 communicate with the cooling plenum 460. An island 442 interconnects the inner shield 406 and the outer baffle 408. An annular array of cooling slots 440 extend through the island 442. The cooling slots 440 communicate with the cooling air plenum 460 and an axial gap between the baffle flange 422 and the shield flange 412.

As seen in FIG. 14, the single-piece aft heat shield 504 comprises an annular inner shield 506 including a forward cylindrical section 509 followed by an aft conical section 511, with an annular shield flange 512 at the aft end of the conical section 511. An outer baffle 508 includes a conical baffle wall 520 having an annular baffle flange 522 at an aft end of the conical baffle wall 520. An island 542 interconnects the inner shield 506 and the outer baffle 508. An annular array of cooling slots 540 extend through the island 542. The cooling slots 540 communicate with the open area forward of the baffle flange 522, and an axial gap between the baffle flange 522 and the shield flange 512.

Figure 10:
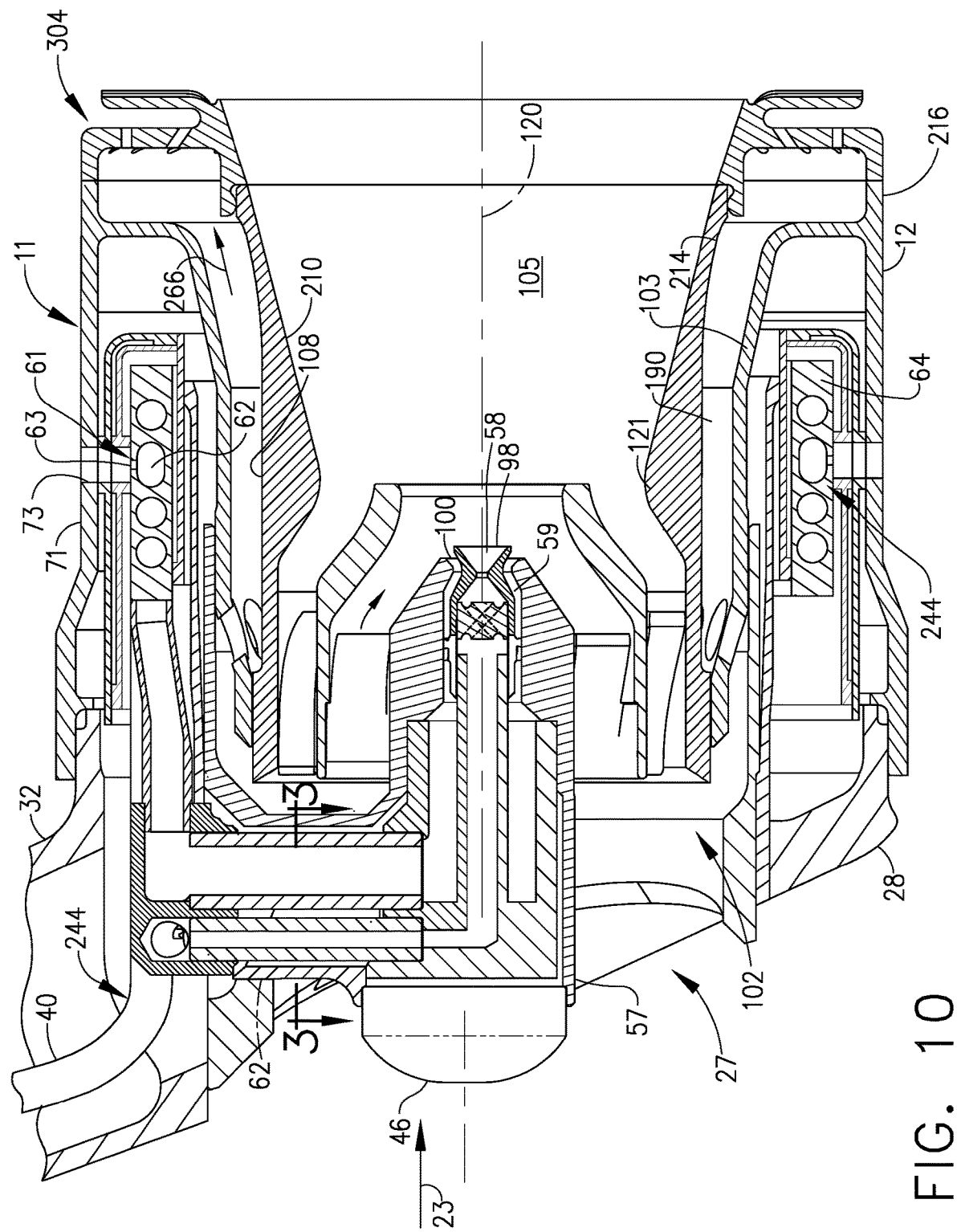
FIG. 10 is a cross sectional view illustration of a fuel nozzle tip with an alternative aft heat shield in accordance with an embodiment.
Figure 11:
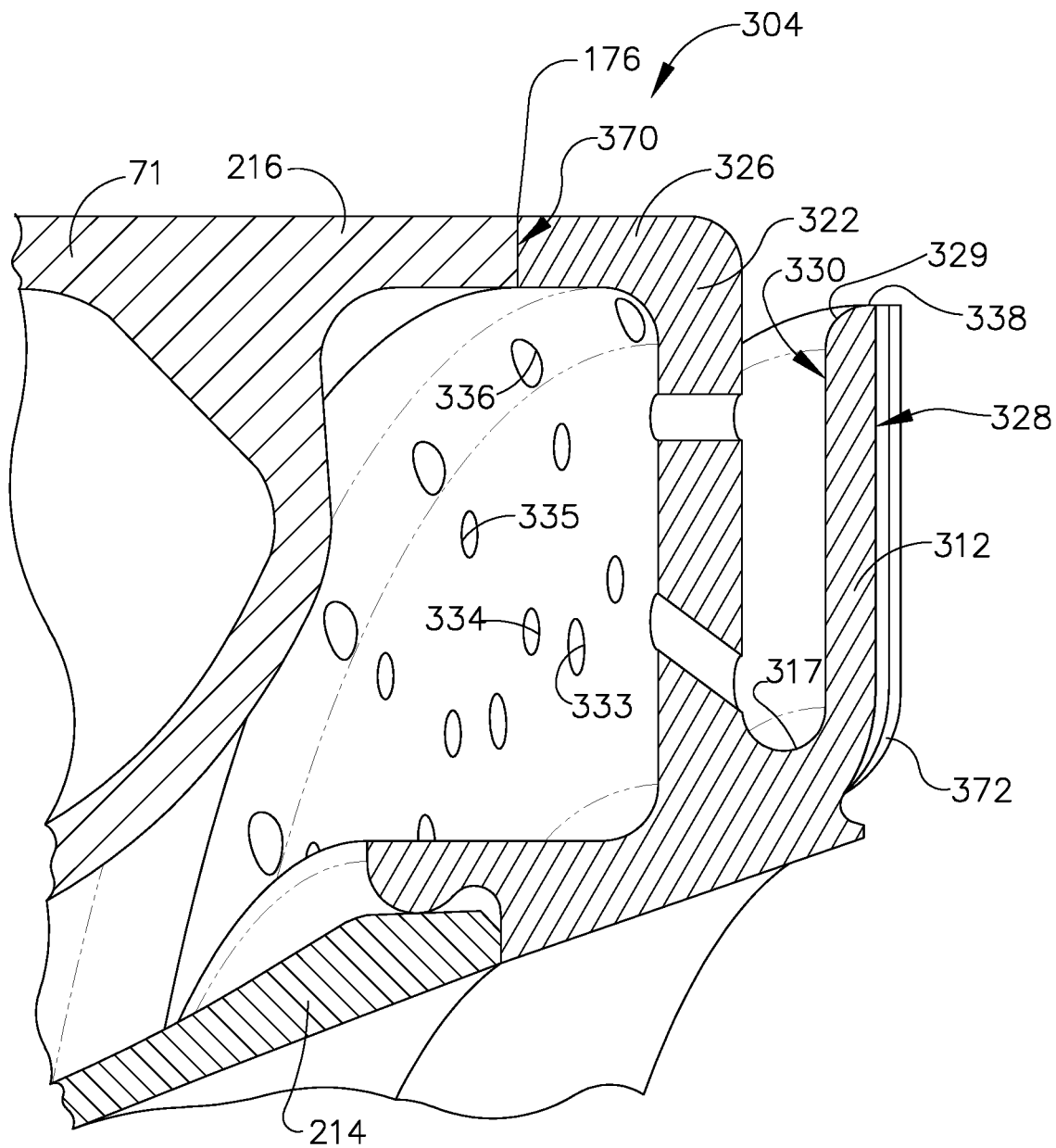
FIG. 11 is a cut away perspective view of a portion of the aft heat shield illustrated in FIG. 10.

FIG. 10 illustrates an alternative nozzle tip 11' comprising the fuel nozzle body 12 described above, with an aft heat shield 304 attached or bonded to the aft end of the fuel nozzle body 12. The aft heat shield 304 is an alternative to the aft heat shield 204 described above. Except for the differences between the two aft heat shields 204 and 304, the nozzle tip 11' and the nozzle tip 11 described above are identical in construction.

Referring to FIGS. 10, 11, 12, and 13, the aft heat shield 304 includes an annular shield wall including a forward cylindrical section 309 followed by an aft conical section 311. An annular baffle flange 322 extends radially outward from a middle portion of the aft conical section 311, and an annular shield flange 312 extends radially outward from an aft end of the aft conical section 311. An axial gap is present between the baffle flange 322 and the shield flange 312, and a concave inner radius 317 is defined at the juncture of the baffle flange 322, the aft conical section 311, and the shield flange 312.

An annular radially outer rim 326 extends axially forward at the radially outer extent of the baffle flange 322, and includes a planar forward surface 370 configured for a metallurgical bond to the fuel nozzle outer casing 71, as described in more detail below.

A counterbore 313 extends part way through a front end of the cylindrical section 309. In the illustrated example, the radially inner surface of the counterbore 313 is formed as a convex-curved fillet or land 315.

A convex radius 329 is formed at the intersection of the forward face 330 and radially outer face 338 of the shield flange 312. A layer of thermal barrier coating 372 of a known type may be bonded to the aft face 328 of the shield flange 312 to provide additional thermal protection for the fuel nozzle body 12 of the nozzle tip 11.

The baffle flange 322 includes a plurality of cooling holes configured with the objective of achieving and even metal temperature distribution and hence minimal induced stress field over the full extent of the shield flange 312, so as to maximize reliability and life of this component. In the particular example illustrated the baffle flange 322 includes four annular arrays or annular rows of cooling holes, from an innermost radial position to an outermost radial position.

The first row of holes 333 is positioned and oriented to provide cooling air in areas of the shield flange 312 near the inner radius 317. This row of holes 333 is oriented inward (i.e. outlet at lower radius than inlet) at an acute angle to the centerline axis 120, so as to direct impingement flow onto the surface of the shield flange 312 at the tangent line defined between the inner radius 317 and the forward face 330 of the shield flange 312.

The second and third rows of holes 334, 335 respectively, are located radially outboard of the first row of holes 333. They are positioned and oriented to direct cooling flow at 90° onto the forward face 330 of the shield flange 312 to provide cooling coverage over the majority of the shield flange 312. They extend parallel to the centerline axis 120.

A fourth row of holes 336 is positioned near the extreme outer diameter of the baffle flange 322, adjacent the radially outer rim 326. This row of holes 336 is oriented outward (i.e. outlet at higher radius than inlet) at an acute angle to the centerline axis 120, so as to defuse the impingement cooling flow that exits through the gap between plates in order to reduce its impact on the local mixer flow field; and to establish circulation of the film cooling air over the outer edge of the shield flange 312 along radius 329 and face 338 and to encourage recirculation of this cooling air flow on the aft face of the shield flange 312 near its outer diameter rather than to permit relatively hot combustion products recirculating upstream from the combustion zone into this location.

The aft heat shield 304 is installed as follows. The cylindrical section 309 of the aft heat shield 304 may be mounted to the aft end 214 of the conical wall section 210 using a slip fit between the radially outer surface 172 and the cylindrical section 309. Specifically, the radially outer surface 172 is fitted into the counterbore 313 in the cylindrical section 309, with the land 315 contacting the radially outer surface 172.

After the slip fit is complete, the radially outer rim 326 of the annular baffle flange 322 may be welded or otherwise metallurgically bonded to the casing aft end 216 of the fuel nozzle outer casing 71 illustrated at the weld seam 176 illustrated in FIG. 10. A typical welding process (for example, TIG welding or automated MIG welding, which are types of fusion welding) involves a torch, electrode, or other heat source that moves in a path around the circumference of the weld seam 176.

The weld process applies uneven heat circumferentially in the weld zone around the two mating components. This is normal for the weld process. The shrinkage associated with the uneven heating (in a direction perpendicular to the joint plane) can cause the aft heat shield 304 to rotate laterally or distort to the conical wall section 210 as the weld is completed. Axial binding within the slip joint may occur, depending on the length of overlap and relative radial tolerance between mating features. The shape of the convex land 315 minimizes the chances for binding to occur thereby reducing chances for misalignment or inconsistency in the end gap of the final mated joint.

Figure 16:
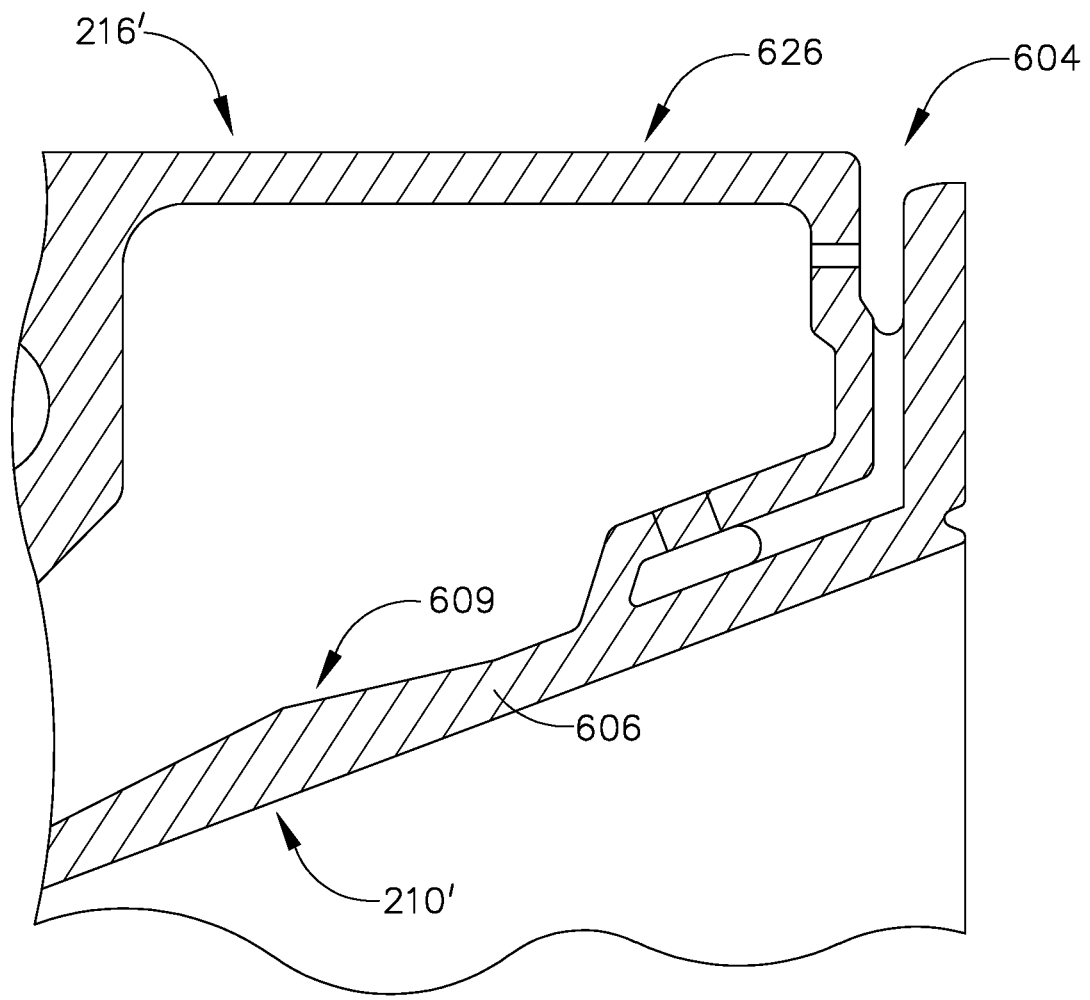
FIG. 16 is a cross-sectional view of a portion of an alternative version of the aft heat shield illustrated in FIG. 14, constructed integrally with a fuel nozzle body.

It is noted that all or a portion of any of the aft heat shields described herein may be constructed as part of a unitary, one piece, or monolithic structure or element in combination with all or a portion of the fuel nozzle structures described above and may be manufactured utilizing a rapid manufacturing process such as Direct Metal Laser Sintering (DMLS) or Direct Metal Laser Melting (DMLM). For example, FIG. 16 illustrates an aft heat shield 604 made in this manner. This aft heat shield 604 is similar in construction to the aft heat shield 404 shown in FIG. 14; however as illustrated its inner shield 606 (corresponding to inner shield 406) extends axially forward and its forward section 609 is seamlessly integrated with a conical wall section 210' corresponding to the conical wall section 210 of the annular pilot housing 108 shown in FIG. 10. Furthermore, a radially outer rim 626 of the aft heat shield 604 extends axially forward and is seamlessly integrated with a conical wall section 216' corresponding to the aft end 216 of the casing 71 shown in FIG. 10.

Figure 17:
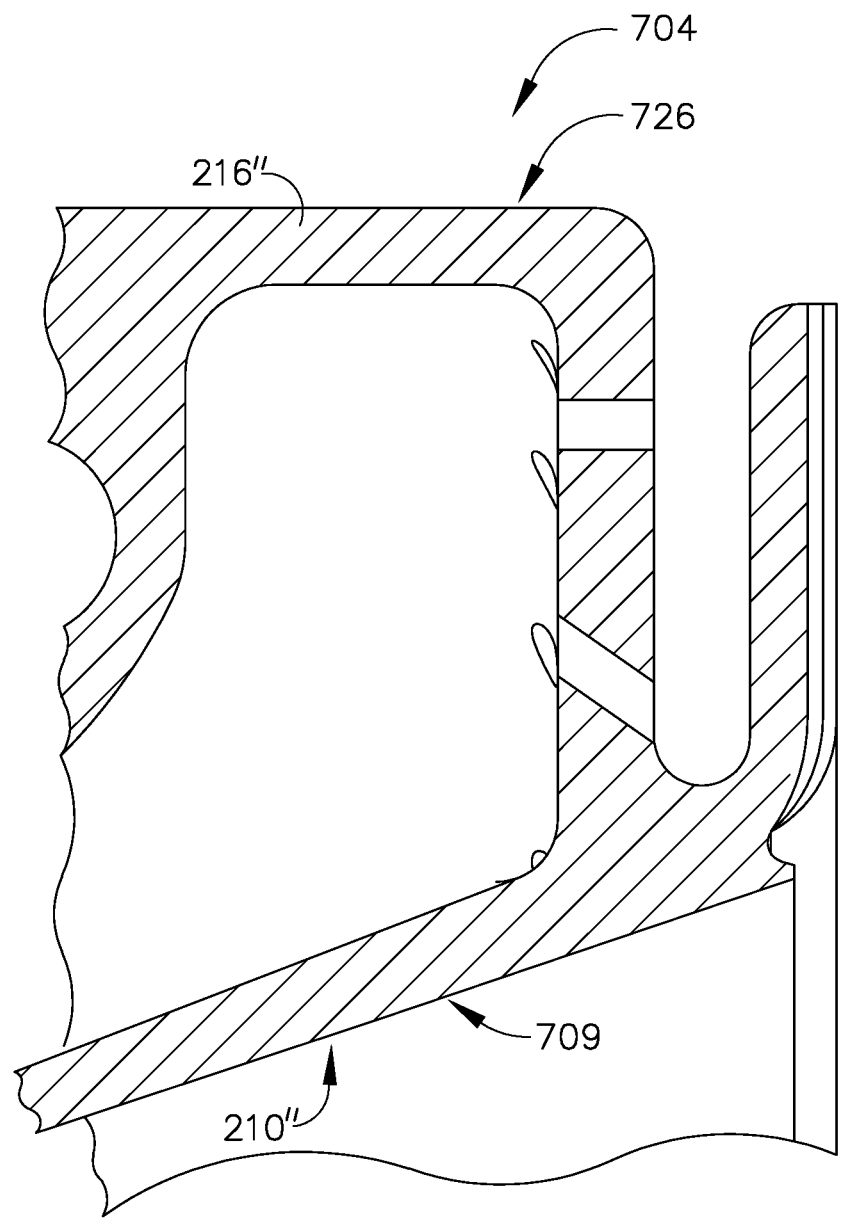
FIG. 17 is a cross-sectional view of a portion of an alternative version of the aft heat shield illustrated in FIG. 12, constructed integrally with a fuel nozzle body.

FIG. 17 illustrates another example of an aft heat shield 704 made in this manner. This aft heat shield 704 is similar in construction to the aft heat shield 304 shown in FIG. 12; however as illustrated its forward section 709 (corresponding to forward section 309) is seamlessly integrated with a conical wall section 210" corresponding to the conical wall section 210 of the annular pilot housing 108 shown in FIG. 10. Furthermore, a radially outer rim 726 of the aft heat shield 704 extends axially forward and is seamlessly integrated with a conical wall section 216" corresponding to the aft end 216 of the casing 71 shown in FIG. 10.

Figure 12:
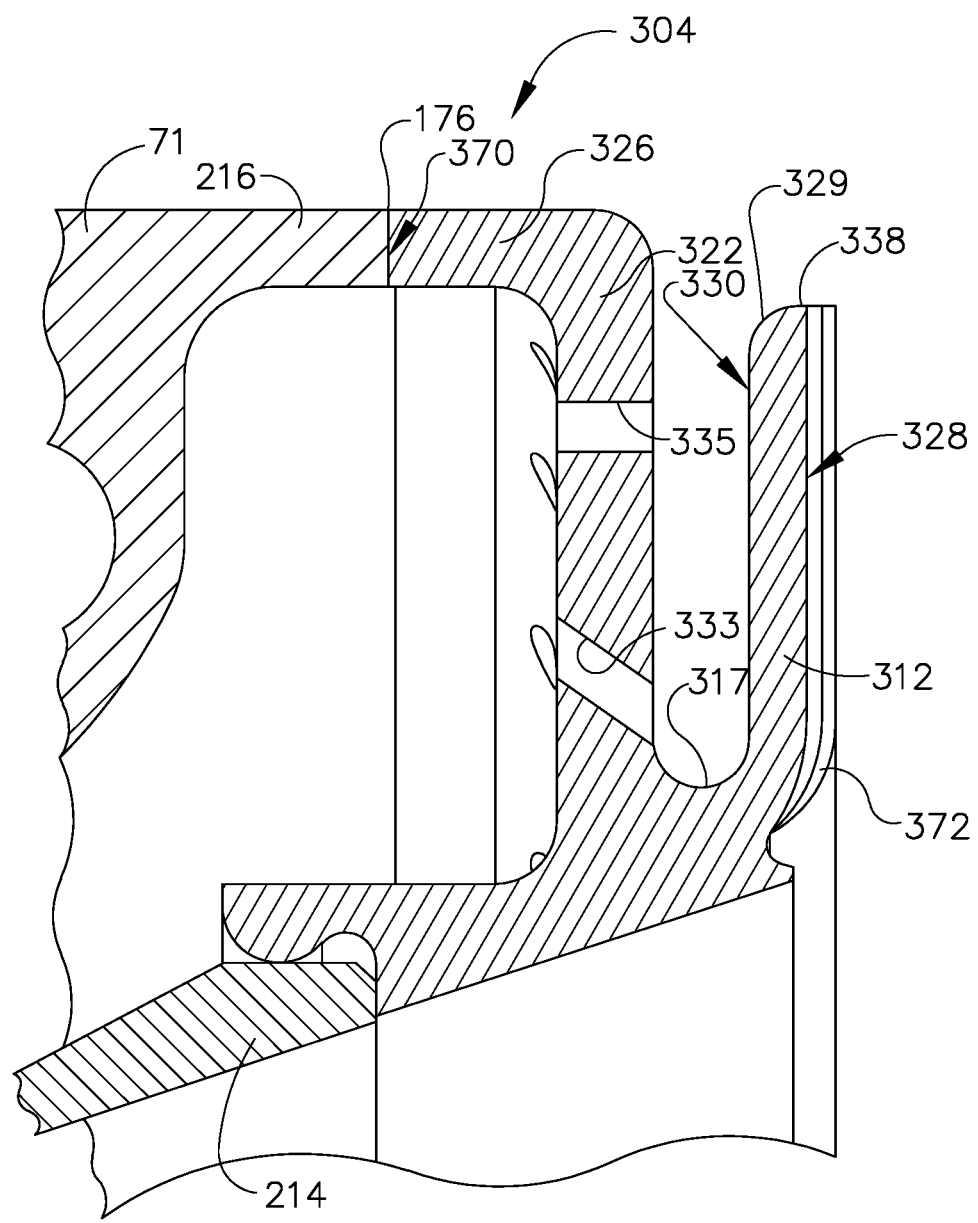
FIG. 12 is an enlarged view of a portion of the heat shield illustrated in FIG. 10.
Figure 13:
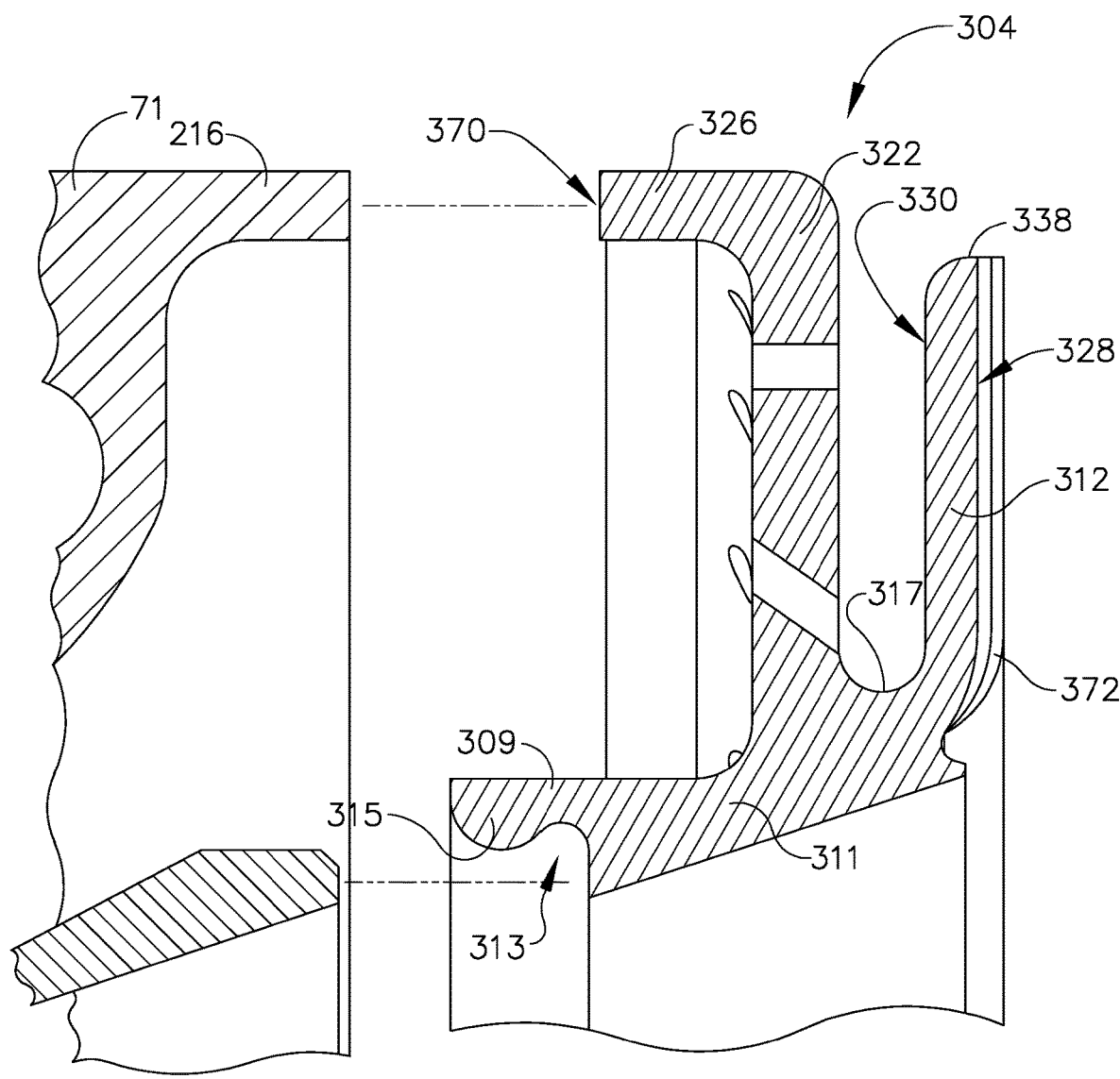
FIG. 13 is an exploded view of the heat shield shown in FIG. 12.

After field use, any of aft heat shields described above may be removed and replaced with a replacement heat shield. The replacement method will varying depending on the original configuration of the aft heat shield.

Where the aft heat shield was originally manufactured as a separate component and attached to the fuel nozzle body, as with the aft heat shields 204 and 304 shown in FIGS. 3 and 12, respectively, the replacement would begin by severing the weld seam 176, for example by cutting or grinding, thereby freeing the aft heat shield to be separated from the fuel nozzle body 12. If needed the aft end 216 of the fuel nozzle body 12 may be prepared by grinding, chemical cleaning, etc. to prepare it for a new weld joint or other metallurgical bond. A replacement aft heat shield 204 or 304 or 404 or 504 would then be assembled to the fuel nozzle body 12, using the slip fit between the aft heat shield 204 or 304 or 404 or 504 and the conical wall section 210 of the annular pilot housing 108, and metallurgically bonded at the radially outer rim 226 or 326 or 426 or 526 as described above.

Where the aft heat shield was originally manufactured as part of a unitary, one piece, or monolithic structure with all or part of the fuel nozzle body, using the aft heat shield 604 shown in FIG. 16 as an example, the replacement would begin by severing the aft heat shield through the forward section 609, and the radially outer rim 626, for example by cutting or grinding, thereby freeing the aft heat shield to be separated from the fuel nozzle body 12. The aft heat shield may be severed along cutting planes roughly corresponding to the joints shown in FIG. 12. If needed the aft end 216' of the fuel nozzle body 12 and the conical wall section 210' may be prepared by grinding, chemical cleaning, etc. to prepare them for a new weld joint or other metallurgical bond. A replacement aft heat shield similar or identical in design to the heat shield 604 would be then be assembled to the fuel nozzle body 12 and metallurgically bonded, for example by brazing or welding. This process is also representative of replacement of the aft heat shield 704 shown in FIG. 17.

Optionally, after the heat shield 604 is removed, the conical wall section 210' may be machined to the same shape as the cylindrical radially outer surface 172 seen in FIG. 2. This would then enable an aft heat shield similar or identical to the aft heat shields 204 and 304 and 404 and 504 shown in FIGS. 3 and 12, respectively to be assembled to the fuel nozzle body 12, using the slip fit between the aft heat shield 204 or 304 or 404 or 504 and the modified conical wall section 210', and metallurgically bonded at the radially outer rim 226 or 326 or 426 or 526 as described above.

The aft heat shields 204 and 304 described above allow practical field repair of fuel nozzle by replacing and welding a new heat shield. The two piece design and configuration of aft heat shield 204 serves to relieve part stress resulting from thermal strain and temperature gradients between bore areas of the annular shield flange 212, also referred to as a heat shield plate, and the baffle flange 222. The two piece design allows field repair of fuel nozzle by replacing and welding a new heat shield. The slot bore cooling design uses plenum 260 and the cooling slots 240 to cool the heatshield bore 218 and flange 212 providing increased surface cooling enhancement while managing dust intake and preventing clogging of the cooling surfaces and holes with dust.

The foregoing has described a fuel nozzle and heat shield for a gas turbine engine, and a method of making and assembling the same. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A fuel nozzle apparatus for a gas turbine engine, the fuel nozzle apparatus comprising:
   an annular pilot housing, the pilot housing including a conical wall section having a diverging conical aft end;
   an annular main fuel injector surrounding the pilot housing;
   an annular fuel nozzle casing surrounding the annular main fuel injector; and
   a heat shield comprising:
   an annular shield wall having a forward cylindrical section with a counterbore formed therein, the diverging conical aft end of the pilot housing being attached to the counterbore through a slip fit;
   an annular shield flange extending radially outward from an aft end of the shield wall;
   an annular baffle flange surrounding the shield wall, and disposed such that an axial gap is defined between the shield flange and the baffle flange, the baffle flange including a radially outer rim extending axially forward from a radially outer extent of the baffle flange; and
   a plurality of impingement cooling holes passing through the baffle flange and oriented so as to direct air flow towards the shield flange.

2. The apparatus of claim 1, wherein:
   the annular shield wall includes an aft conical section;
   an aft end of the annular fuel nozzle casing is bonded to the radially outer rim of the baffle flange through a metallurgical bond.

3. A method of repairing the apparatus of claim 1 after field use, the method comprising:
   separating the heat shield from the pilot housing and the fuel nozzle casing; and
   metallurgically bonding a replacement heat shield to the pilot housing and the fuel nozzle casing.

4. A method of assembling the fuel nozzle apparatus of claim 1, comprising:
   engaging the conical wall section of the pilot housing to the counterbore of the forward cylindrical section of the heat shield using the slip fit; and
   metallurgically bonding an aft end of the annular fuel nozzle casing to the radially outer rim of the baffle flange thereby forming a metallurgical bond.

5. The method of claim 4, wherein the metallurgical bond is formed by fusion welding.

6. A method of repairing a fuel nozzle apparatus for a gas turbine engine after field use, wherein the fuel nozzle apparatus includes an annular pilot housing, the pilot housing including a conical wall section having a diverging conical aft end, an annular main fuel injector surrounding the pilot housing, an annular fuel nozzle casing surrounding the annular main fuel injector, and a heat shield having an annular shield wall having a forward cylindrical section with a counterbore formed therein, the diverging conical aft end of the pilot housing being attached to the counterbore through a slip fit, an annular shield flange extending radially outward from an aft end of the shield wall, an annular baffle flange surrounding the shield wall, and disposed such that an axial gap is defined between the shield flange and the baffle flange, the baffle flange including a radially outer rim extending axially forward from a radially outer extent of the baffle flange, and a plurality of impingement cooling holes passing through the baffle flange and oriented so as to direct air flow towards the shield flange, the method comprising:
   separating the heat shield from the pilot housing and the fuel nozzle casing;
   assembling the conical wall section of the pilot housing to a counterbore formed in the cylindrical section of a replacement heat shield through a slip fit; and
   metallurgically bonding an aft end of the annular fuel nozzle casing to a radially outer rim of a baffle flange of the replacement heat shield.

7. The method of repairing the fuel nozzle apparatus after field use of claim 6, the method further comprising:
   machining an aft end of the conical wall section of the pilot housing to include a cylindrical outer surface.

\* \* \* \* \*